M. E. HILTNER.
VACUUM FILTER.
APPLICATION FILED OCT. 30, 1909.

957,558.

Patented May 10, 1910.
2 SHEETS—SHEET 1.

Witnesses,
J. S. Freeman
B. P. Fishburne

Inventor
M. E. Hiltner,
By
C. L. Parker, Attorney

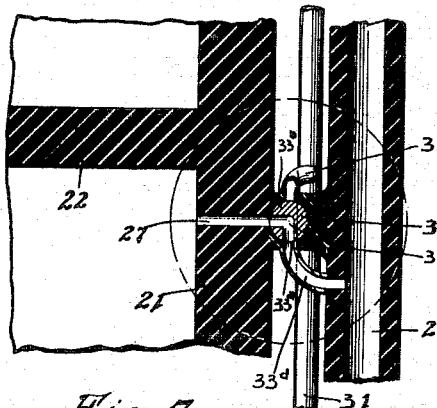
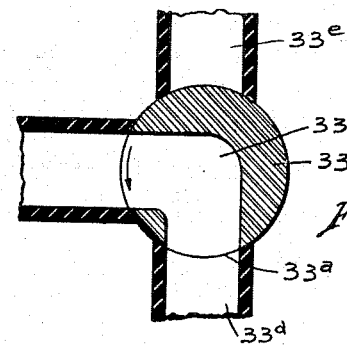
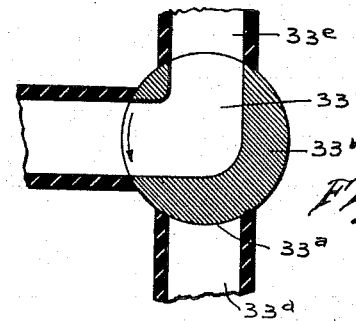
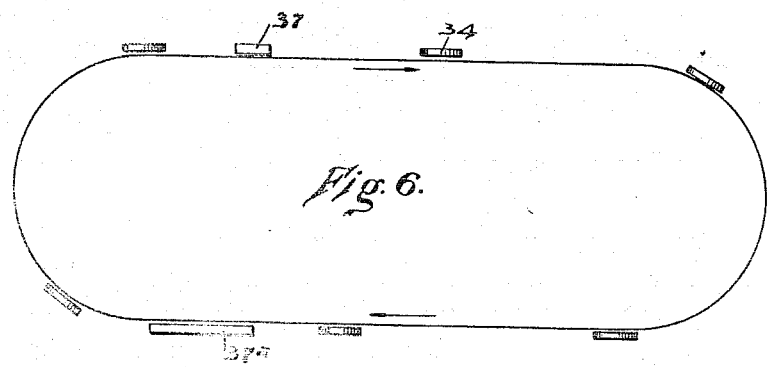

UNITED STATES PATENT OFFICE.

MARTIN E. HILTNER, OF DEADWOOD, SOUTH DAKOTA.

VACUUM-FILTER.

957,558.  Specification of Letters Patent.  Patented May 10, 1910.

Application filed October 30, 1909. Serial No. 525,509.

*To all whom it may concern:*

Be it known that I, MARTIN E. HILTNER, a citizen of the United States, residing at Deadwood, in the county of Lawrence and State of South Dakota, have invented certain new and useful Improvements in Vacuum-Filters, of which the following is a specification.

My invention relates to filters and more particularly to vacuum filters.

An important object of my invention is to provide a vacuum filter, embodying novel means for cleansing the filter mats of the same, while the device is in operation.

A further object of my invention is to provide a filter, which will render the process of filtering continuous, expeditious, and comparatively cheap.

My filter may be employed for filtering any solution containing solid particles therein, and it is particularly adapted to filter water from metallurgical works, which contains slimes and sands.

My invention consists generally of an endless belt, upon which are arranged filter plates, means for supplying the material to be treated upon said filter plates, and means for drawing fluid through the filter plates.

Figure 1:
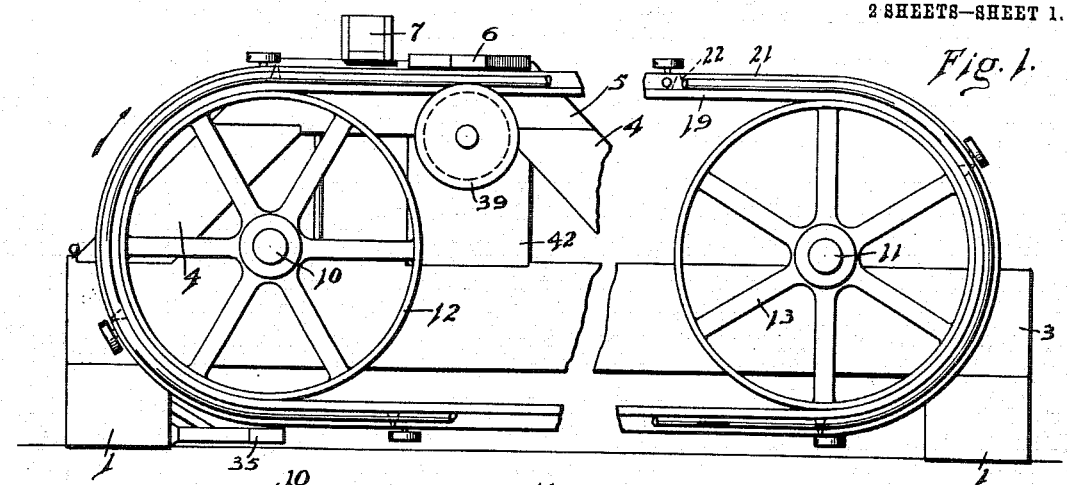
Figure 2:
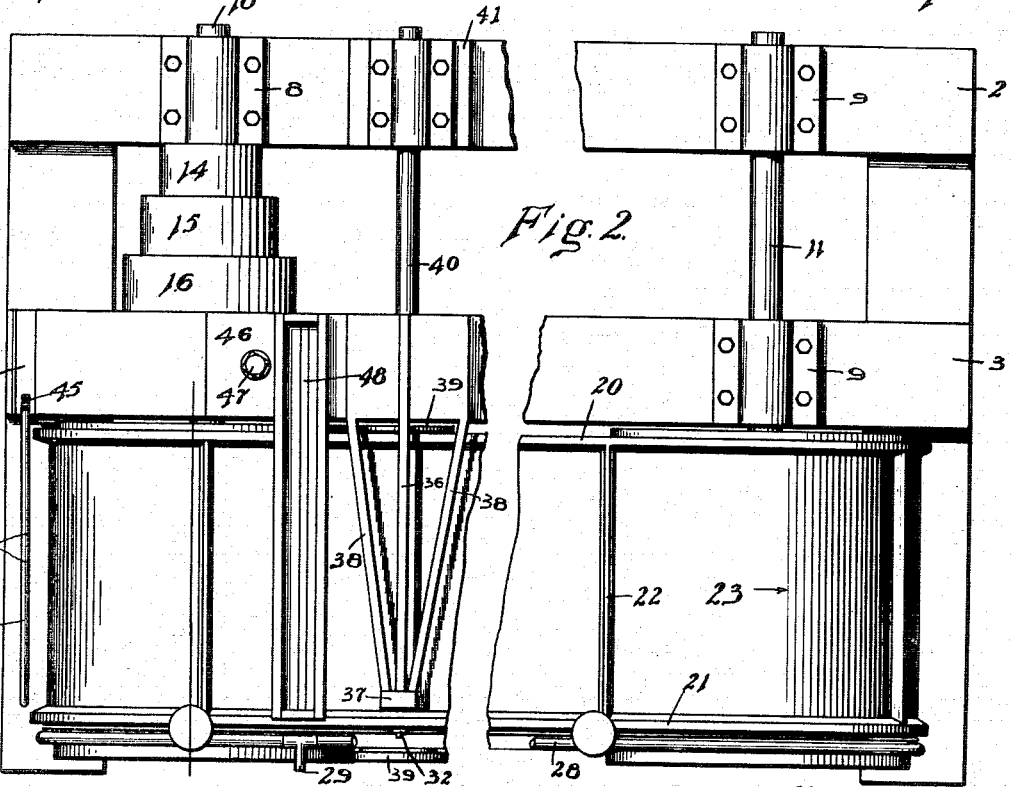
Figures 3, 4:
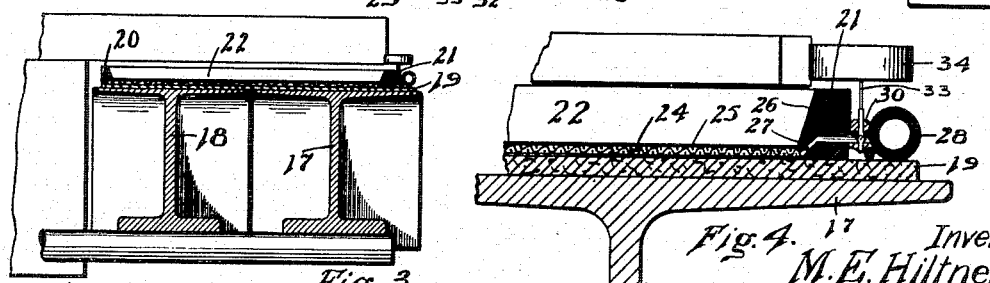

In the accompanying drawings, forming a part of this specification, and in which like numeral references are used to designate like parts, throughout the same, Figure 1 is a side view of my device, portions thereof being broken away. Fig. 2 is a plan view of the same. Fig. 3 is a vertical fragmentary cross-sectional view taken on line 3—3 of Fig. 2. Fig. 4 is an enlarged view of a portion of Fig. 3, the feed box being removed. Fig. 5 is an enlarged horizontal sectional view taken through one of the three-way valves, and members associated therewith. Fig. 6 is a diagrammatic view of the three-way valves and the stationary trips. Fig. 7 is an enlarged view of the three-way valve and branch pipes, shown in Fig. 5. Fig. 8 is a similar view to Fig. 7, the valve being shown in another position.

In the preferred embodiment of my invention, my device comprises transverse base end beams 1, spaced away from each other, upon which are arranged spaced longitudinal supporting beams 2 and 3. The beams 2 and 3 are parallel to each other, said beam 2 being arranged adjacent corresponding ends of the base beams 1, while the supporting beam 3 is arranged centrally of the same. The longitudinal supporting beam 3, is provided near one end thereof with diagonally arranged supports 4, upon the upper ends of which is secured a horizontal beam 5, upon which are arranged trip 6 and feed box 7, hereinafter to be referred to. The supporting beams 2 and 3 are provided with transversely alined journal boxes 8 and 9 near the ends thereof, within which are rotatably mounted shafts 10 and 11, which extend laterally beyond said beam 3, and are provided with pulleys 12 and 13 rigidly secured thereto. Between the beams 2 and 3, the shaft 10 is provided with steep pulleys 14, 15 and 16, whereby said shaft may be driven at different rates of speed. Each of the pulleys 12 and 13 may consist of a single wheel, or two pulleys 17 and 18 arranged side by side and in engagement with each other, as shown in Fig. 3.

Trained about pulleys 12 and 13, is an endless belt 19, which may be formed of any suitable form of belting, upon which is suitably secured the upwardly projecting longitudinal flexible strips 20 and 21. The strip 20 is arranged at one edge of the endless belt 19, while the strip 21 is spaced away from the other edge of the said belt 19, and said strips 20 and 21 are connected at spaced intervals by transverse strips 22, whereby said endless belt 19 is divided into a plurality of equal rectangular compartments 23. It is to be understood that the strips 20, 21 and 22 are to be formed of some suitable water tight flexible material, and I have found that the same may be advantageously formed of rubber, although I do not restrict myself to the use of rubber alone. Within each of the compartments 23, is arranged a section of flexible corrugated or porous material 24 which serves as a filter bed or mat. The filter bed 24, may be formed of felt or like material, and is covered upon its upper surface by a section of cloth 25, such as canvas, said bed 24 and cloth 25 being held in place by binding strips 26. The binding strips are flexible and may be formed of rubber or like material.

Each of the compartments 23 is provided adjacent the strip 21, with an angular opening 27, which passes through the strips 21 and 26, and communicates with one edge of the filter mat 24. As above stated, strip 21 is spaced away from the outer edge of the belt 19, and upon the portion of said belt 19 adjacent its outer edge, is arranged a section of flexible hose 28, which is secured upon said belt 19 by any suitable means, such as by cementing, and the ends of the section of hose 28 are united by a metallic T-joint 29, upon which may be rotatably secured one end of a hose leading from a suitable vacuum pump (not shown). Between the strip 21 and the hose 28, there is arranged a three-way valve 30, which may preferably be of the form shown in Fig. 5, and which is adapted to alternately establish communication between the opening 27 and the hose 28, which may now be termed the vacuum hose, and a second smaller pressure hose 31, which is suitably secured to the belt 19, between hose vacuum 28 and strip 21, and which has the ends thereof united by a metallic T-joint 32, upon which may be rotatably secured one end of a section of a hose leading from a pressure pump (not shown).

The specific manner in which each of the three-way valves 30 establishes alternate communication between each of the openings 27, and the exhaust pipe 28 and pressure pipe 31, will be readily understood by reference to Fig. 5. The three-way valve 30 comprises a seat $33^a$, within which is rotatably mounted a circular valve closure $33^b$ provided with an angular opening $33^c$. The vacuum pipe 28 is provided adjacent the valve seat $33^a$, with a branch pipe $33^d$, which communicates with valve seat $33^a$, as clearly shown in Fig. 5. The pressure pipe 31, communicates with valve seat $33^a$ opposite branch pipe $33^d$, by means of a branch pipe $33^e$. The valve $33^b$ is provided with a rotative stem 33, upon the upper end of which is rigidly secured a wheel 34, which is adapted during the travel of the belt 19, to engage the upper stationary trip 6 and a lower stationary trip 35, which is secured to one of the base beams 1. The upper trip 6 comprises a support formed of a rod 36, suitably and rigidly secured to the upper side of the beam 5, said rod 36 being arranged transverse of the belt 19, and carrying upon its free end the friction engaging member 37, which is also connected to diagonally arranged brace rods 38.

It is to be understood that the length of the engaging member 37 and the corresponding member $37^a$ of the lower 35, are to be of sufficient length to rotate the wheel 34 a desired number of degrees for alternately establishing and breaking communication between the opening 27 and the vacuum hose 28 and the pressure hose 31. I therefore make the length of the engaging member 37 one quarter of the circumference of the wheel 34, and the length of the engaging member $37^a$ of the lower-trip three-quarters of the length of the circumference of the wheel 34, whereby when said wheel passes member 37 it will be rotated one-quarter of a revolution (counter-clock-wise) for rotating the valve closure $33^a$ to break the communication between the opening 27 and the branch pipe $33^e$ of pressure hose 31, and establish communication between said opening 27 and branch pipe $33^d$ of vacuum pipe 28, as shown in Figs. 5 and 7. Upon the further travel of the endless belt 19, the wheel 34 will be brought in contact with the member $37^a$, whereby said wheel 34 and valve closure $33^a$ will be rotated three-fourths of a revolution, for establishing communication between the branch pipe $33^e$ of pressure hose 31 and said opening 27, as shown in Fig. 8.

It is to be understood that all of the valves 30 are similar and operate in a similar manner and therefore only one of them need be described. Directly below the trip 6, is arranged a supporting pulley having flanged ends 39, and between said ends 39, is arranged the endless belt 19. The flanges 39 prevent the lateral displacement of the belt 19, which might occur when the wheel 34 engages the member 37, and the supporting pulley as a whole prevents the sagging of the endless belt 19, said supporting pulley provided with the flanges 39, is rigidly mounted upon a transversely arranged shaft 40, which is journaled upon the supporting blocks 41 and 42, arranged upon the supporting beams 2 and 3 respectively. It is to be understood, that if I should construct my filter of sufficient length I may employ as many supporting pulleys as necessary to prevent the sagging of the endless belt.

Arranged at one end of the supporting beam 3 and adjacent the pulley 12, is a pipe 43, provided with a plurality of sprinkler openings $43^a$ adjacent belt 19, said pipe 43 extending transverse of and entirely across the belt 19, and having the forward end thereof closed, while its opposite end is closed and rigidly mounted upon an angular plate 44, which is in turn rigidly mounted upon the upper side of beam 3 and the lower end of the beam 4. The pipe 43 is further provided with a branch pipe 45 adjacent its rear end, to which may be attached a hose from a water tank (not shown).

The feed box 7 has one end thereof rigidly secured to a plate 46, which is secured to the beam 5 by means of a bolt 47. The feed box 7 extends entirely across the endless belt 19, and is provided in its bottom with a longitudinal opening 48, whereby the liquid to be filtered may be fed from the feed box over the entire width filter pads.

In the operation of my device, the pulleys 12 and 13 are rotated in the direction indicated by the arrow, water or other liquid to be filtered is then fed into the feed box 7, from which the water is fed upon each successive compartment of the endless belt 19 and upon the filter pad therein as the same are brought under said feed box. As each compartment is advanced past the feed box, the three-way valve associated with the same is actuated by the upper trip 6, for establishing communication between the vacuum hose 28 and the opening 27 leading to the filter pad. The liquid of the material distributed upon each pad is thus sucked through the filter pad into the vacuum hose 28, from which it is conducted away through the T-shaped joint 29, by means of the hose secured thereto and to the vacuum pump. The solid particles of the material being filtered are caught upon the upper surface of the filter cloth, from which they are removed in a manner hereinafter to be explained. Each compartment is then rotated past the lower trip and each valve is rotated by the member 37ª to establish communication between the pressure hose 31 and the opening 27. Air or water is under pressure in hose 21 and will then circulate through the filter pad and cloth, and aid in removing the solid particles from the filter cloth. Each compartment with its respective filter pad and cloth is then rotated past the pipe 43 and said filter cloth is washed of all remaining small particles. As each compartment again rotates past the upper trip communication is again established with the vacuum hose and opening 27, and the operation of the valves is repeated in the same order until the machine is stopped.

Having fully described my invention, I claim:—

1. In a filter of the character described, an endless belt, a filtering medium arranged upon said endless belt, a pressure conduit communicating with said filtering medium, a vacuum conduit communicating with said filtering medium, and a single device for controlling both of said conduits.

2. In a filter of the character described, an endless belt, a filtering medium arranged upon said endless belt, vacuum and pressure conduits communicating with said filter medium, a single device controlling both of said conduits, and stationary members for actuating said device.

3. A filter of the character described, comprising pulleys, an endless belt trained about said pulleys, a filtering medium arranged upon said endless belt, a vacuum hose, a pressure hose, a three-way valve associated with said filtering medium, vacuum, hose and pressure hose, and means for rotating said valve during the travel of said endless belt.

4. In a filter of the character described, a filter medium, a vacuum hose, a pressure hose, means for alternately establishing communication between said filter medium, said vacuum hose and pressure hose, and means for sprinkling said filter medium during its communication with said pressure hose.

5. In a filter of the character described, a filter medium, a vacuum hose, a pressure hose, a three-way valve for alternately establishing communication between said filter medium, vacuum hose and pressure hose, and means for rotating said valve.

6. A filter of the character described, comprising pulleys, an endless belt trained about said pulleys, a plurality of flexible filtering media arranged upon said belt, each of which is provided with an opening in communicating therewith, a vacuum hose, a pressure hose, a three-way valve arranged adjacent each one of the filtering media, for alternately establishing communication between said opening, vacuum hose and pressure hose, and stationary means successively rotating each of said valves.

7. In a filter of the character described, a plurality of filter media connected together for forming an endless belt, means for moving said filter media, vacuum and pressure conduits communicating with each of said filter media, and a rotary valve for controlling said conduits.

8. In a filter of the character described, a plurality of filter media connected together for forming an endless belt, means for moving said endless belt, an opening communicating with each of said filter media, vacuum and pressure conduits communicating with said opening, and a valve for controlling said opening.

In testimony whereof I affix my signature in presence of two witnesses.

MARTIN E. HILTNER.

Witnesses:
C. A. COE,
W. A. HANSON.